US012438168B2

(12) United States Patent
Pmsvvsv et al.

(10) Patent No.: US 12,438,168 B2
(45) Date of Patent: Oct. 7, 2025

(54) FUEL CELL STACK GROUNDING THROUGH AN IMPEDANCE CREATING ELEMENT

(71) Applicant: BLOOM ENERGY CORPORATION, San Jose, CA (US)

(72) Inventors: Prasad Pmsvvsv, Sunnyvale, CA (US); Arne Ballantine, Palo Alto, CA (US); Adil A. Ashary, San Jose, CA (US); David Edmonston, Soquel, CA (US); Michael Petrucha, Santa Clara, CA (US); Tad Armstrong, Burlingame, CA (US); Matthias Gottmann, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 829 days.

(21) Appl. No.: 16/504,665

(22) Filed: Jul. 8, 2019

(65) Prior Publication Data
US 2020/0020964 A1 Jan. 16, 2020

Related U.S. Application Data

(60) Provisional application No. 62/696,475, filed on Jul. 11, 2018.

(51) Int. Cl.
H01M 8/04664 (2016.01)
H01M 8/04537 (2016.01)
(Continued)

(52) U.S. Cl.
CPC ... H01M 8/04679 (2013.01); H01M 8/04559 (2013.01); H01M 8/2425 (2013.01);
(Continued)

(58) Field of Classification Search
None
See application file for complete search history.

(56) References Cited

U.S. PATENT DOCUMENTS 7,974,106 B2 * 7/2011 Gurunathan .......... H02M 7/497
363/69
8,026,013 B2 9/2011 Valensa et al.
(Continued)

FOREIGN PATENT DOCUMENTS

JP 04259758 * 9/1992 ............. Y02E 60/50
JP 2000058079 * 2/2000 ............. Y02E 60/50
(Continued)

OTHER PUBLICATIONS

Notification of Transmittal of the International Search Report and Written Opinion of the International Search Authority for International Patent Application No. PCT/US2019/040766, mailed Oct. 25, 2019, 11 pages.
(Continued)

Primary Examiner — Jonathan Crepeau
Assistant Examiner — Angela J Martin
(74) Attorney, Agent, or Firm — THE MARBURY LAW GROUP PLLC

(57) ABSTRACT

A fuel cell system includes a plurality of fuel cell segments, each segment having a plurality of fuel cells. The segments include a positive terminal having a positive voltage with respect to ground and a negative terminal. The fuel cell system also includes at least one component electrically connecting the negative terminal to ground, the at least one component configured to decrease a surge current through the segments.

17 Claims, 13 Drawing Sheets

(51) Int. Cl.
  *H01M 8/12* (2016.01)
  *H01M 8/2425* (2016.01)
  *H01M 8/2465* (2016.01)

(52) U.S. Cl.
  CPC .. *H01M 8/2465* (2013.01); *H01M 2008/1293* (2013.01); *H01M 2200/103* (2013.01); *H01M 2200/106* (2013.01)

(56) References Cited

U.S. PATENT DOCUMENTS

| | | | | |
|---|---|---|---|---|
| 8,440,362 | B2* | 5/2013 | Richards | H01M 8/249 29/897.3 |
| 9,639,130 | B2 | 5/2017 | Gurunathan et al. | |
| 10,873,099 | B1 | 12/2020 | Gurunathan et al. | |
| 2004/0174141 | A1* | 9/2004 | Luz | G01R 31/36 320/132 |
| 2005/0093371 | A1 | 5/2005 | Zdziech et al. | |
| 2007/0111061 | A1* | 5/2007 | Matsuno | H01M 8/04604 429/432 |
| 2008/0224687 | A1* | 9/2008 | Breese | H01M 8/04634 324/76.11 |
| 2009/0284080 | A1 | 11/2009 | Kojima et al. | |
| 2010/0124685 | A1 | 5/2010 | Valensa et al. | |
| 2011/0076585 | A1* | 3/2011 | Edmonston | H01M 8/2485 429/454 |
| 2011/0298469 | A1* | 12/2011 | Astrom | H01M 8/04559 324/509 |
| 2015/0288220 | A1 | 10/2015 | Gurunathan et al. | |
| 2019/0051923 | A1 | 2/2019 | Ashary et al. | |
| 2019/0123579 | A1* | 4/2019 | Chen | H02J 7/00306 |
| 2020/0119387 | A1* | 4/2020 | Yanagiuchi | H01M 8/2475 |
| 2020/0212459 | A1* | 7/2020 | Ballantine | H01M 8/04014 |

FOREIGN PATENT DOCUMENTS

| | | | | |
|---|---|---|---|---|
| JP | 2010118151 | * | 5/2010 | Y02E 60/50 |
| WO | WO2010036153 | A1 | 4/2010 | |

OTHER PUBLICATIONS

Notification Concerning Transmittal of International Preliminary Report on Patentability and Written Opinion of the International Search Authority for International Patent Application No. PCT/US2019/040766, mailed Jan. 21, 2021, 8 pages.

Gurunathan, R. et al., "Advanced Uninterruptable Power Module Controller And Method of Operating Same," U.S. Appl. No. 15/945,159, filed Apr. 4, 2018.

Pmsvvs, P. et al., "Selective Grounding of Grid Parallel Inverter Systems," U.S. Appl. No. 16/250,153, filed Jan. 17, 2019.

U.S. Appl. No. 15/455,307, filed Mar. 10, 2017.

* cited by examiner

FUEL CELL STACK GROUNDING THROUGH AN IMPEDANCE CREATING ELEMENT

FIELD

The present invention is generally directed to fuel cell systems and in particular to a stack of solid oxide fuel cells that is grounded through an impedance creating element.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

BRIEF DESCRIPTION OF THE DRAWINGS

FIG. 3I is a schematic showing an addition of a multiple circuit breakers according to an embodiment.

SUMMARY

Figure 1:
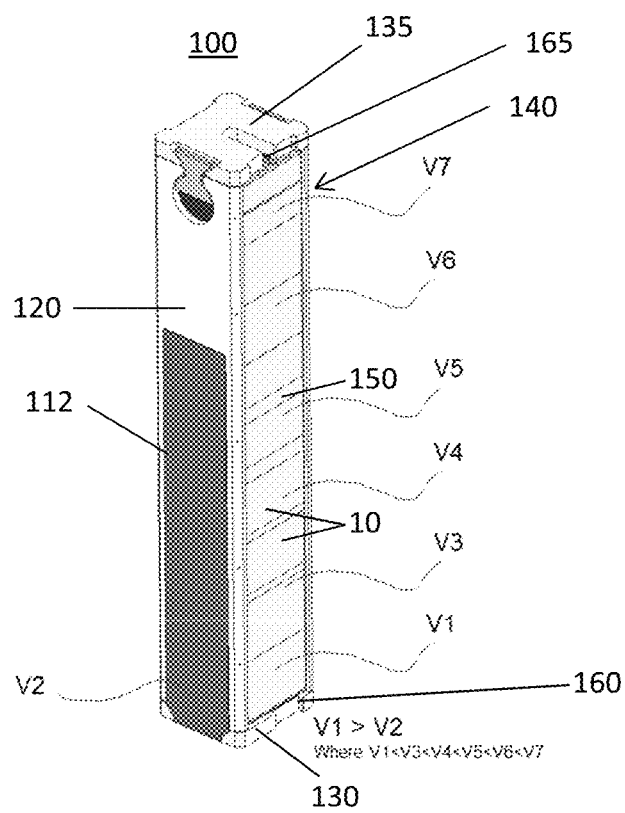
FIG. 1 illustrates a three dimensional view of a fuel cell stack according to an embodiment.

Embodiments comprise a fuel cell system, the fuel cell system comprising a plurality of fuel cell segments, each segment having a plurality of fuel cells. The segments comprise a positive terminal having a positive voltage with respect to ground and a negative terminal. The fuel cell system also comprises at least one component electrically connecting the negative terminal to ground, the at least one component configured to decrease a surge current through the segments.

In some embodiments, when in operation, a potential of the negative terminals may be substantially 0 V with respect to ground. The surge current may correspond to a voltage across the at least one component of greater than 300 V.

In one embodiment, the at least one component may comprise a fuse, a circuit breaker and/or at least one resistor. The at least one component may be configured to decrease the surge current in 10 ms or less. The fuel cells may be solid oxide fuel cells. At the least one component may comprise a plurality of components electrically connecting each of the negative terminals to ground. Each negative terminal may be electrically connected to ground via a different one of the plurality of components.

In one embodiment, each negative terminal may be electrically connected by a negative line to a first end of the at least one component and a second end of the at least one component may be electrically connected to ground. In operation, the surge current may pass between the first and second ends of the at least one component. Decreasing the surge current may prevent overheating of at least one of the plurality of fuel cell segments. Maintaining the potential of the negative terminals at substantially 0 V with respect to ground decreases corrosion of the negative terminal. Each segment may comprise a first fuel cell column having the negative terminal and a second fuel cell column having the positive terminal.

In one embodiment, the negative terminal may be connected to a first DC/DC converter via a negative line. The positive terminal may be connected to a second DC/DC converter via a positive line. The DC/DC converters may be connected to a DC/AC inverter. The positive lines may be maintained at a non-zero potential with respect to ground.

Other embodiments also include a method of operating a fuel cell system comprising providing a plurality of fuel cell segments, each segment having a plurality of fuel cells. The plurality of segments may comprise a positive terminal having a positive voltage with respect to ground and a negative terminal. The method includes providing a surge current through at least one component connecting the negative terminal to ground, the at least one component decreasing the surge current through one or more of the segments.

In some embodiments, the at least one component may comprise a fuse or circuit breaker and may method further comprise opening the fuse or circuit breaker in response to the surge current passing through the fuse or circuit breaker. In one embodiment, the method further comprising detecting a fault in the fuel cell system by measuring a potential of the negative terminal with respect to ground, measuring a potential of the positive terminal with respect to ground, and locating the fault in the system by comparing the potential of the negative terminal to the potential of the positive terminal.

In another embodiment, a method of detecting a fault in a fuel cell segment having a plurality of fuel cells includes measuring a potential of a negative terminal of the segment with respect to ground, measuring a potential of a positive terminal of the segment with respect to ground, and locating the fault in the segment by comparing the potential of the negative terminal to the potential of the positive terminal.

In one embodiment, comparing the potential of the negative terminal to the potential of the positive terminal includes determining a total voltage that occurs at the positive terminal when the negative terminal is grounded, and locating a fuel cell column containing the fault in the segment by dividing the total voltage by a number of fuel cell columns in the segment between the negative terminal and the positive terminal, and comparing the total voltage divided by the number of columns against the potential of the negative terminal.

DETAILED DESCRIPTION

The instant inventors observed that one way to address certain faults occurring in fuel cell stacks is to add impendence creating elements, such as fuses, resistors, and/or circuit breakers to the system that will decrease or eliminate surge current resulting from the faults.

Operation of fuel cells can lead to corrosion of various components of the cell assemblies, particularly where the side baffles and cells are made of ceramic materials. Corrosive alkali and alkali earth compounds can form at negative lines, for example, as a result of ionic diffusion of alkali and alkali earth ions. Such corrosion can be decreased in various ways, including by grounding the negative lines of fuel stacks to prevent formation of these corrosive compounds. However, the present inventors realized certain faults such as line to ground faults or line to line faults can arise as a result of grounding the negative lines. These faults may occur when portions of the assemblies other than the grounded lines are inadvertently grounded and/or shorted to other components in the assemblies, causing large and unwanted internal current flows.

Embodiments include a fuel cell system, comprising a plurality of fuel cell stacks, each stack having a plurality of fuel cells. Fuel cell stacks are arrangements of cells such that the cells are electrically connected in series. The cells in a fuel cell stack may share common end plates. One or more fuel cell stacks may be arranged in a fuel cell column containing positive and negative electrical terminals (e.g., termination plates). In one embodiment, a column may include multiple stacks arranged such that they are electrically in series with one another. Two or more columns electrically in series with one another may form a "segment," which is an electrical unit or component comprising plural columns of fuel cells. The system may further comprise at least one component connecting the negative lines to ground, the at least one component configured to decrease a surge current through one or more of the negative lines.

In other embodiments, the assembly may comprise a plurality of components connecting each of the respective negative lines to ground, wherein each of the plurality of components is configured to decrease a surge current through one or more of the negative lines. Each negative line may be electrically connected to ground via a different one of the plurality of components.

A potential of the negative lines may be substantially 0 V with respect to ground. The surge current may correspond to a voltage across the at least one component of greater than 300 V. The at least one component may comprise an impedance creating element such as a fuse, a circuit breaker, and/or at least one resistor. Each negative line may be electrically connected to a first end of the at least one component and a second end of the at least one component may be electrically connected to ground. The surge current may pass between the first and second ends of the at least one component. Decreasing the surge current may reduce or prevent damage or overheating of at least one of the plurality of fuel cell stacks. The at least one component may be configured to decrease the surge current in 10 ms or less.

The fuel cells may be ceramic fuel cells, such as solid oxide fuel cells. Maintaining the potential of the negative lines at substantially 0 V with respect to ground decreases corrosion of the system components by mobile alkali or alkali earth ions.

Still other embodiments include a method of operating a fuel cell system, comprising providing a plurality of fuel cell segments, each segment having at least one stack or column containing a plurality of fuel cells. The segments may comprise a positive line having a positive voltage with respect to ground and a negative line. The method may comprise providing at least one impedance creating element, such as a fuse, circuit breaker, or resistor connecting the negative lines to ground to decrease a surge current through one or more of the negative lines.

FIG. 1 illustrates a fuel cell stack assembly 100 according to a comparative embodiment of the present disclosure, as described in more detail in U.S. patent application Ser. No. 15/954,901 ("the '901 Application"), filed on Apr. 17, 2018 and is herein incorporated in its entirety. The assembly 100 includes a fuel cell stack column 140, side baffles 120 disposed on opposing sides of the column 140, a lower block 130, and a compression assembly 135 including an upper block. The column includes one or more fuel cell stacks 10, optional fuel manifolds 150 disposed between the fuel cell stacks 10, and termination plates 160 and 165 disposed on opposing ends of the column 140. The fuel cell stacks 10 include a plurality of fuel cells stacked upon one another and separated by interconnects. A plurality of the fuel cell stack assemblies 100 may be attached to a base similar to that shown in FIG. 1 of the '901 Application.

Figure 2:
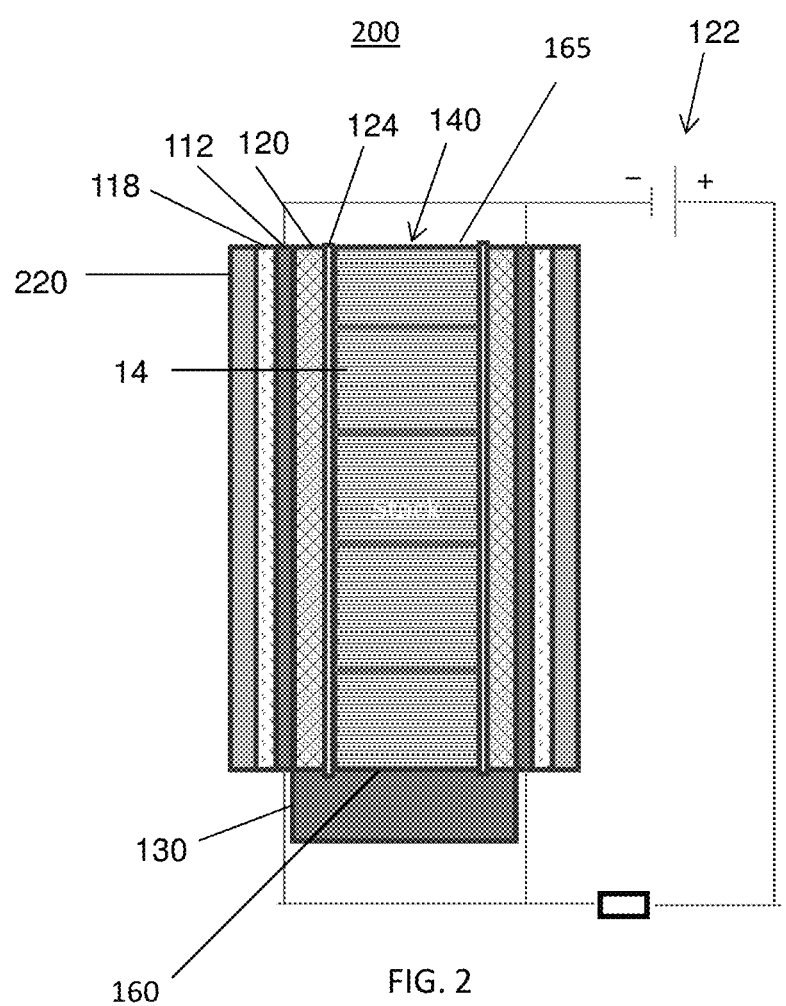
FIG. 2 illustrates a side view of a fuel cell stack assembly according to an embodiment.

An assembly 200 of a column 140 of stacks 10 of solid oxide fuel cells with an external electrode 112 is illustrated in FIG. 2. In assembly 200, the column 140 includes one or more fuel cell stacks 10. The column 140 of fuel cell stacks 10 may include more or fewer fuel cell stacks 10 as desired. During operation of the assemblies 100 or 200 to generate electricity at an elevated temperature above 700 degrees C., each of the stacks 10 in the column 140 has a respective electrical potential (i.e., voltage) V1, V3-V7. In the example shown in FIG. 1, the potential (i.e., voltage) V2 applied to the external electrode 112 is more negative than the lowest potential V1 of the stack 10 (e.g., the lowest stack 10) in the column 140 (i.e., V2<V1). In one embodiment shown in FIG. 1, the potential of each stack 10 increases (i.e., is increasingly more positive) from bottom to the top of the column 140 (i.e. V1<V3<V4<V5<V6<V7). However, other suitable voltages may be used.

The external electrode 112 may comprise any suitable electrically conductive material, including a metal or metal alloy, such as chromium, tungsten, titanium, tantalum, titanium nitride, Inconel (e.g., Inconel 800 alloy), etc. The external electrode 112 in the embodiment of FIG. 2 is not electrically connected to the stacks 14 of the column 140 or to any other hot box components.

As illustrated in FIG. 2, the external electrode(s) 112 may be electrically connected to an external or internal power source 122 to apply a more negative potential to the external electrodes 112 than the stacks 10. That is, the power source 122 may be located internal to the fuel cell system or external from the system. The power source 122, for example, may be a battery, the electric grid or a down converted electrical output of a power conditioning module electrically connected to the fuel cell assembly 200.

In the assembly 200 of FIG. 2, the external electrode(s) 112 are electrically isolated from the stacks 10 in the column 140 and other hotbox components such the metallic inter-stack baffles 220. The inter-stack baffles 220 may be wedge-shaped metal or metal alloy (e.g., Inconel) baffles that are inserted between adjacent side baffles 120. The inter-stack baffles 220 separate adjacent columns 140 of stacks 10 of fuel cells in a SOFC system that has multiple columns 140 of fuel cells. To achieve electrical isolation, a ceramic dielectric layer 118 (e.g., electrically insulating Cermaic Matrix Composite ("CMC") material or ceramic felt) may be added between the inter-stack baffle 220 and the external electrode 112 on the side of the side baffle 120.

The assembly 200 optionally includes a ceramic felt 124 located between the fuel cell stacks 10 and the side baffles 120. The ceramic felt 124 helps prevent to the flow of air and/or fuel from leaking out the sides of the fuel cells and thereby helps guide the air and fuel through the fuel cell stacks 10. While external electrode 112 reduces or prevents corrosion of the side baffles 120, it is desired to also reduce or prevent corrosion of other assembly components such as fuel cells, interconnects, and lines.

Figure 3A:
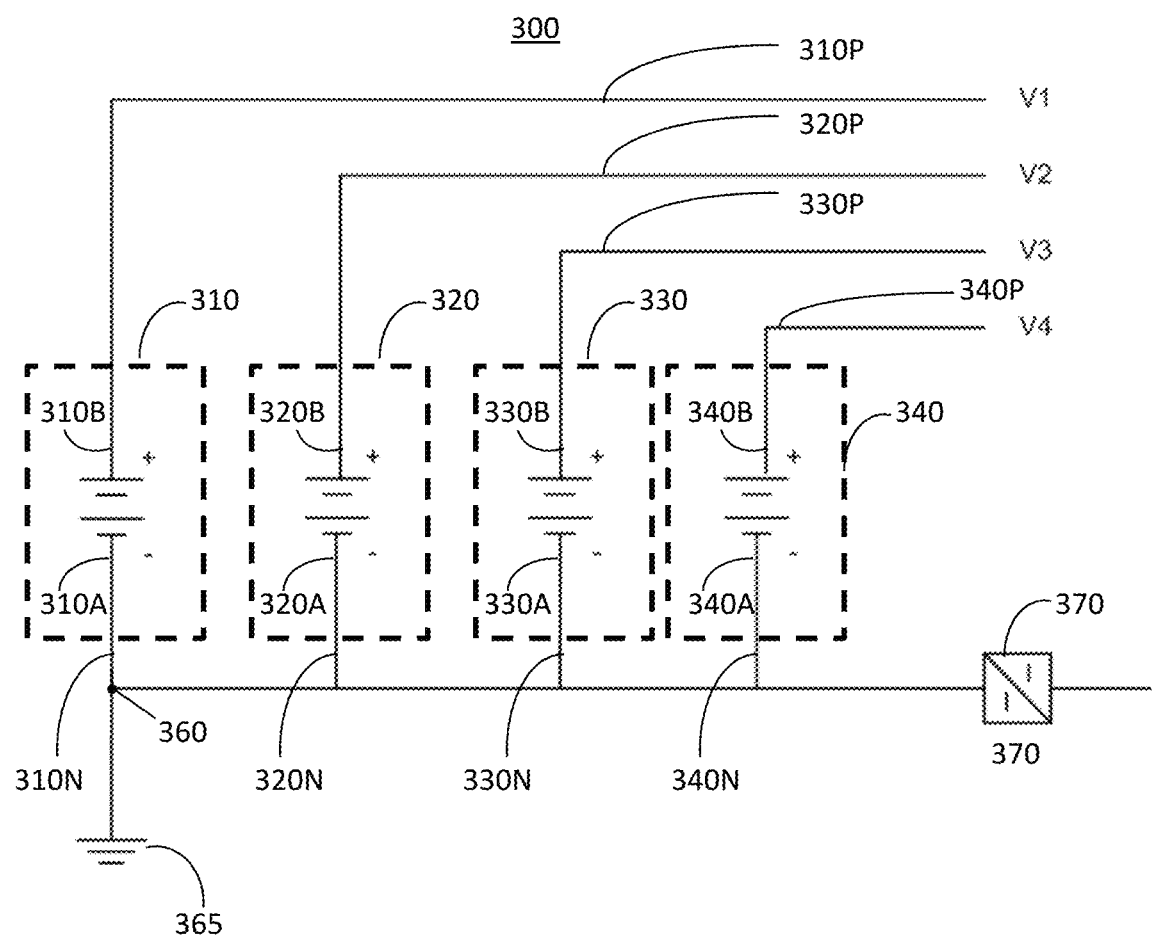
FIG. 3A is a schematic of a fuel cell assembly according to an embodiment.

FIG. 3A shows an electrical schematic of a fuel cell assembly 300 according to an embodiment. The fuel cell assembly 300 shown in FIG. 3A includes four segments 310-340. Each segment 310-340 is represented in FIG. 3A generally as a power source, for the sake of convenience. The four segments 310-340 may be identical, for example, to assembly 100 in FIG. 1. Segments 310-340 may alternatively or additionally include, for example, the type of fuel cell assembly 200 shown in FIG. 2, or any other suitable type of stack assembly, e.g., in which external electrode 112 is omitted. It is also to be understood that other types of assemblies may be substituted for any one of segments 310-340. It is further understood that the number of segments 310-340 (i.e., 4) in fuel cell assembly 300 is merely exemplary.

Each segment 310-340 is identified by a positive output voltage V1-V4 on each positive line 310P, 320P, 330P, and 340P with respect to the respective negative lines 310N-340N of the segments is 310-340, which are grounded to ground 365 via node 360. FIG. 3A shows each of the assemblies 310-340 electrically connected to the same node 360. However, it is to be understood that each of the assemblies 310-340 can be separately connected to different nodes and that those different nodes may be electrically connected to, for example, ground or a bias voltage. As shown in FIG. 3A, the negative lines 310N-340N may also be electrically connected to a DC/DC converter 370. Likewise lines 310P-340P can be connected to the same or different DC/DC converter, as will be described below with respect to FIG. 5.

FIG. 3A shows an exemplary polarity arrangement for power generation. Each segment has a negative terminal (e.g., 310A is the negative terminal of segment 310, 320A is the negative terminal of segment 320, etc.) associated with the negative polarity of the power generation. Each segment has a positive terminal (e.g., 310B is the positive terminal of segment 310, etc.) associated with the positive polarity of the power generation. In FIG. 3A, the positive terminals 310B-340B provide the output voltages V1-V4 to positive lines 310P-340P, respectively.

Various problems may plague fuel segments 310-340. For example, if fuel segments 310-340 include columns with ceramic elements, there is a potential for corrosion at least where there is ionic diffusion of alkali or alkali earth ions (e.g., Na+) which may corrode ceramic components of each segment line and may reduce the working lifetime and efficiency of the assembly 300. One solution to the corrosion problem is to reduce or prevent the diffusion of negative ions toward the negative terminals 310A-340A by grounding those terminals. When the negative terminals 310A-340A are grounded, they will not attract positive mobile ions. In the configuration shown in FIG. 3A, this may mean, for example, grounding node 360 to effectively ground all of the negative terminals 310A-340A and thus the negative lines 310N-340N.

Figure 3B:
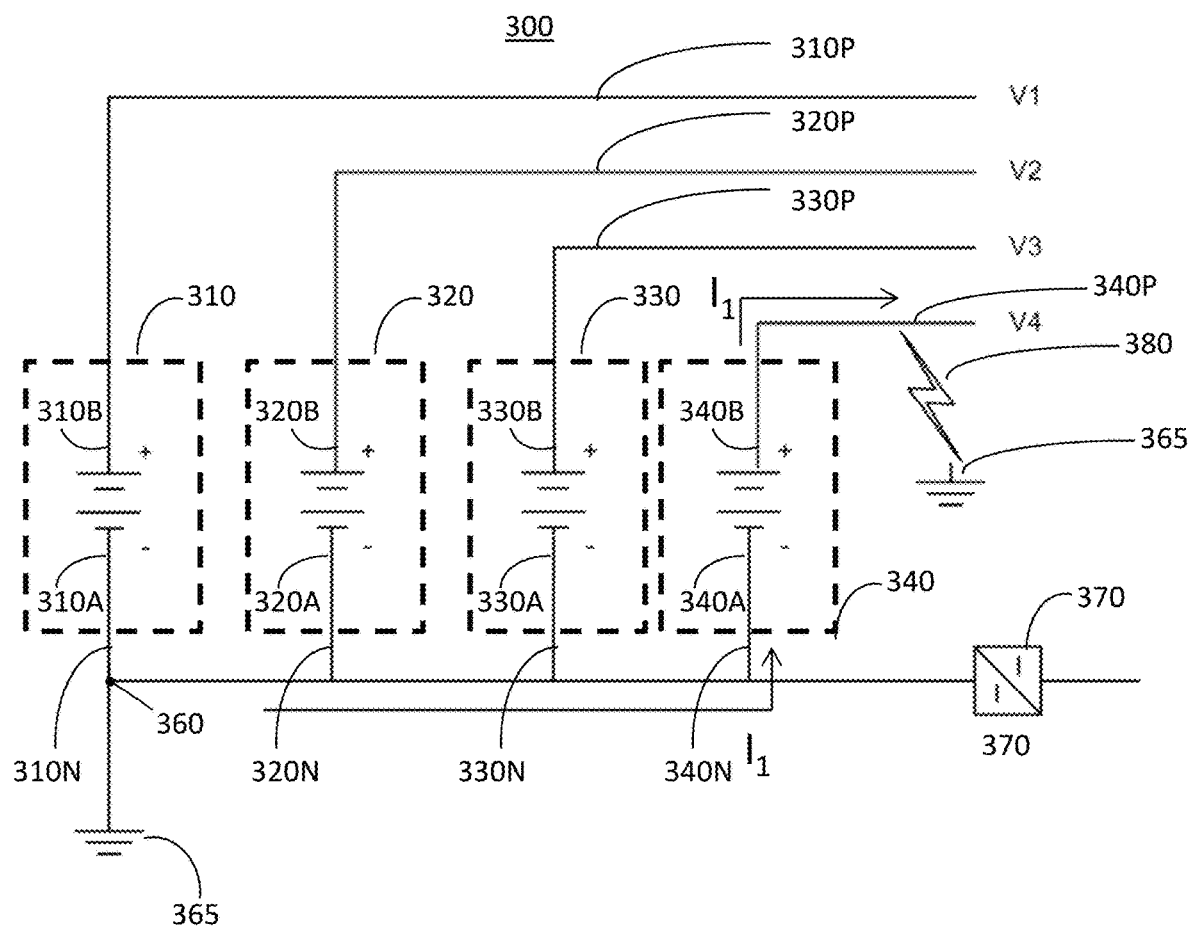
FIG. 3B is a schematic showing a grounding fault in a fuel cell assembly according to an embodiment.

However, grounding negative terminals 310A-340A may lead to further problems, such as the one shown in FIG. 3B. More specifically, FIG. 3B shows a "grounding fault" 380 that may result when node 360 is grounded to decrease corrosion. The fault 380 arises when one or more of the segments 310-340 is unintentionally grounded. In FIG. 3B, fault 380 occurs when positive terminal 340B or positive line 340P is inadvertently grounded, such as by inadvertently connecting it to a grounded plate, device, wire, or other grounded object 365. Since negative terminal 340A and negative line 340N are also grounded via node 360, grounding fault 380 creates a circulating current $I_1$, as shown in FIG. 3B. $I_1$ may be or may result in a relatively large short current through the segment 340. More specifically, current $I_1$ may flow from the positive terminal 340B to ground 365 via fault 380 and flow from ground 365 via node 360 to negative terminal 340A, through segment 340. Current $I_1$ thus can short the output of the entire segment 340.

Current $I_1$ may result in thermal damage to assembly 300 or degradation of its voltage output. For example, $I_1$ will likely degrade output voltage V4 of segment 340. $I_1$ may also cause segment 340 to overheat (e.g., operate at a temperature above 950° C.) to damage the fuel cells, thus decreasing both the lifetime and efficiency of segment 340. Excess heat in segment 340 may also cause excessive heating in neighboring segments (e.g., 330) and the overall assembly 300, again degrading output voltages V1-V4, fuel cell lifetime, and system efficiency of segments 310-340.

Grounding fault 380 and resultant short current $I_1$ may activate various failure prevention mechanisms in the assembly 300. For example, the current $I_1$ may be so large that the entire assembly 300 is automatically shut down, via an abnormal current detection system, a circuit breaker, or other warning/failure detection system. In typical assemblies 300, there are relatively few reliable ways to deal with a short in an individual segment (e.g., 340). The default method can often be to shut down the entire assembly 300. The assembly 300 is then often kept completely offline for the entire time it takes to find, diagnose, and fix the short. Since short diagnosis may take hours or even days, particularly when the assembly 300 is controlled remotely, fuel may be completely or mostly cut off from the entire assembly 300 for extended periods of time. This can cause serious cost issues damage the stacks, and the overall efficiency and performance of assembly 300. Moreover, temperature cycling during repair (e.g., temperature ramp-down time to bring the system down from its operating temperature for servicing and subsequent ramp-up to bring it back online) can damage the stacks and decrease performance. Excessive temperature cycling, particularly if the cycling is performed on a fast time scale, could cause component embrittlement and line to premature failure. This could lead to still more degradation of system efficiency and downtime.

Figure 3C:
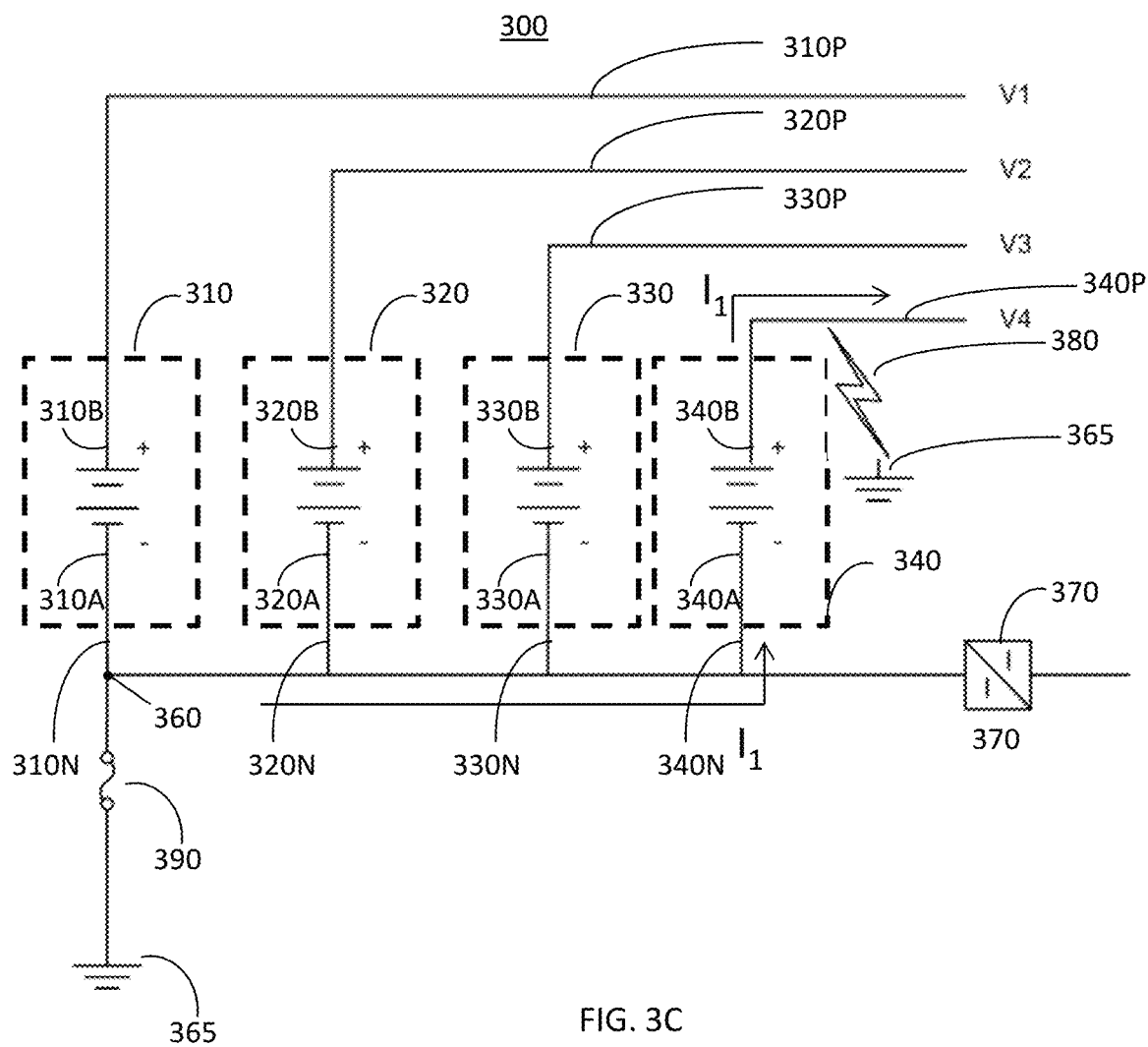
FIG. 3C is a schematic showing an addition of a component to mediate the grounding fault of FIG. 3B according to an embodiment.

One solution to the problem created by current $I_1$ and grounding fault 380, according to various embodiments, is shown in FIG. 3C. The solution places a single component 390, such as an impedance creating element, between node

360 and ground 365. In this arrangement, each of the negative terminals 310A-340A is connected to ground through component 390. Component 390 may be designed such that it causes an open circuit between node 360 and ground 365 when, for example, the current through component 390 exceeds a pre-set threshold. The threshold may be chosen to correspond to a short (e.g., such as a short due to a grounding fault 380 in segments 310-340). Opening the circuit at component 390, then, may prevent the flow of current $I_1$ (FIG. 3B) and the degradation of the output of the entire cell assembly 300 discussed above.

Component 390 may be any suitable device that will create an increased impedance, such as an open a circuit or increase resistance in response to a large or moderate current. For example, component 390 may be a fuse that opens at a particular current, such as 1 A. Component 390 may comprise a number of types of fuses, such a single use or "one time" fuse, multiple use fuses, resettable fuses, cartridge fuses, spade or plug in fuses, SMT or SMD (surface mount technology or surface mount device) fuses, HRC (high running capacity fuses), or axial fuses, for example. One of ordinary skill in the art will recognize that a number of other types of suitable fuses may be used within the context of the present invention as component 390.

As an alternative to fuses, component 390 may be a PTC (positive temperature coefficient) thermistor, circuit breaker or other type of current detecting/stopping device. For example, component 390 may be a single or multiple interrupter circuit breaker, thermal or magnetic protection circuit breakers, molded-case circuit breakers, "plug-in" circuit breakers, etc. One of ordinary skill in the art will recognize that a number of other types of circuit breakers may be used within the context of the present invention as component 390.

Figure 3D:
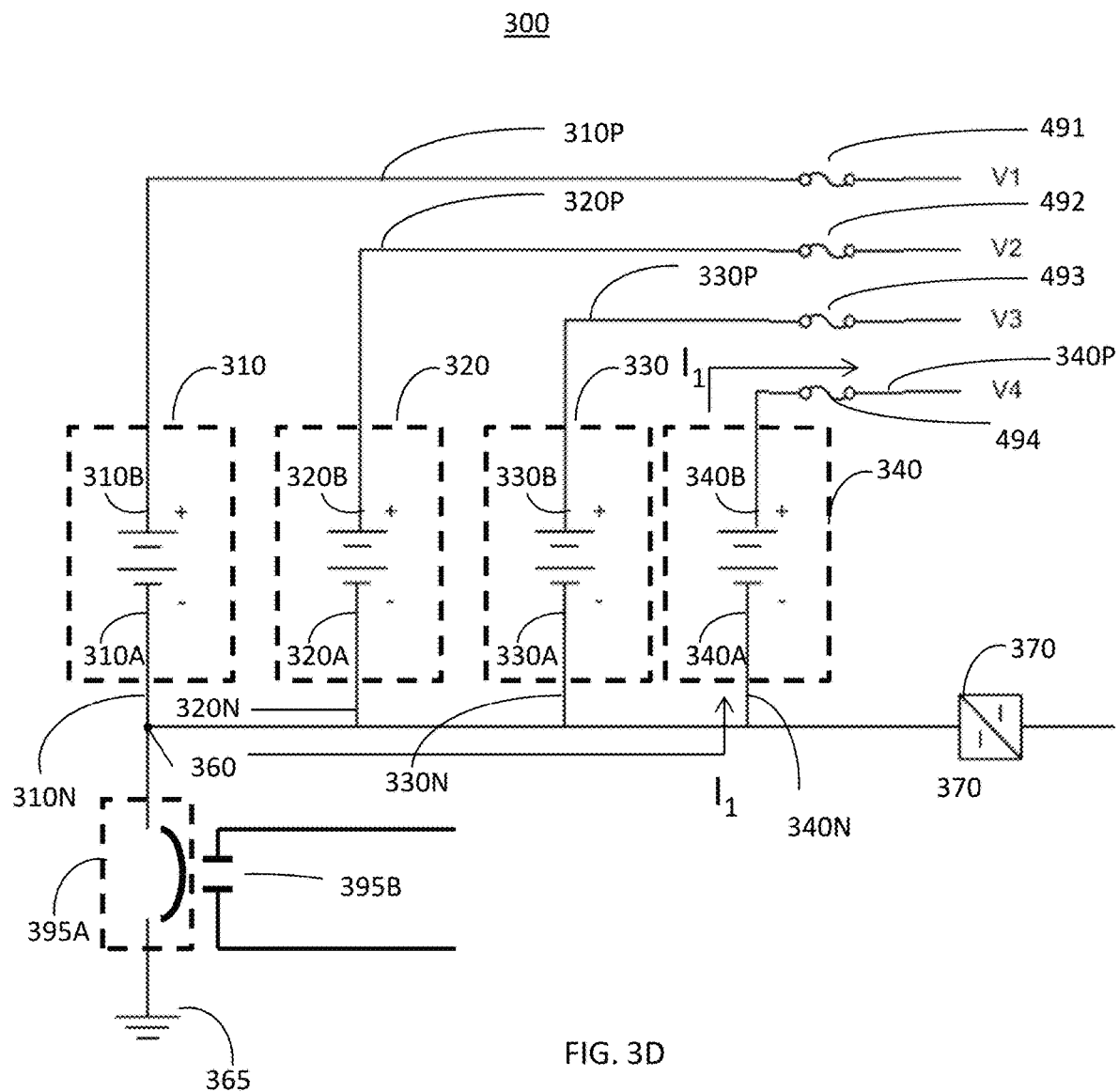
FIG. 3D is a schematic showing an addition of a circuit breaker according to an embodiment.

FIG. 3D shows another embodiment that includes a circuit breaker 395A as a supplement to branch protection fuses 491-494 installed on positive lines 310P-340P, respectively. Circuit breaker 395A in FIG. 3D is installed in place of fuse 390 of FIG. 3C and performs a similar function. More specifically, circuit breaker 395A, can trigger and open the circuit between node 360 and ground 365, reducing or preventing damage to assembly 300 caused by surge current $I_1$, as described above for fuse 390 in the context of FIG. 3C.

Various implementations of assembly 300 may include branch protection fuses 491-494 which may be configured to trigger and, thereby, cause an open circuit in response to a surge current. Branch protection fuses 491-494 may be, for example, pre-installed in the assembly 300. Branch protection fuses 491-494 would protect against, for example, a surge current $I_1$ that exceeds their triggering thresholds. In some applications, it may be advantageous to supplement branch fuses 491-494 with an additional impedance creating element that has a lower triggering or more sensitive triggering threshold, such as circuit breaker 395A than branch fuses 491-494. The lower threshold of circuit breaker 395A would offer additional protection from surge currents to the assembly 300. Alternatively, the threshold of the circuit breaker 395A may be the same or similar as that of branch protection fuss 491-494. In that case, one of the reasons to install circuit breaker 395A may be to facilitate remote monitoring, as discussed below.

Figure 3E:
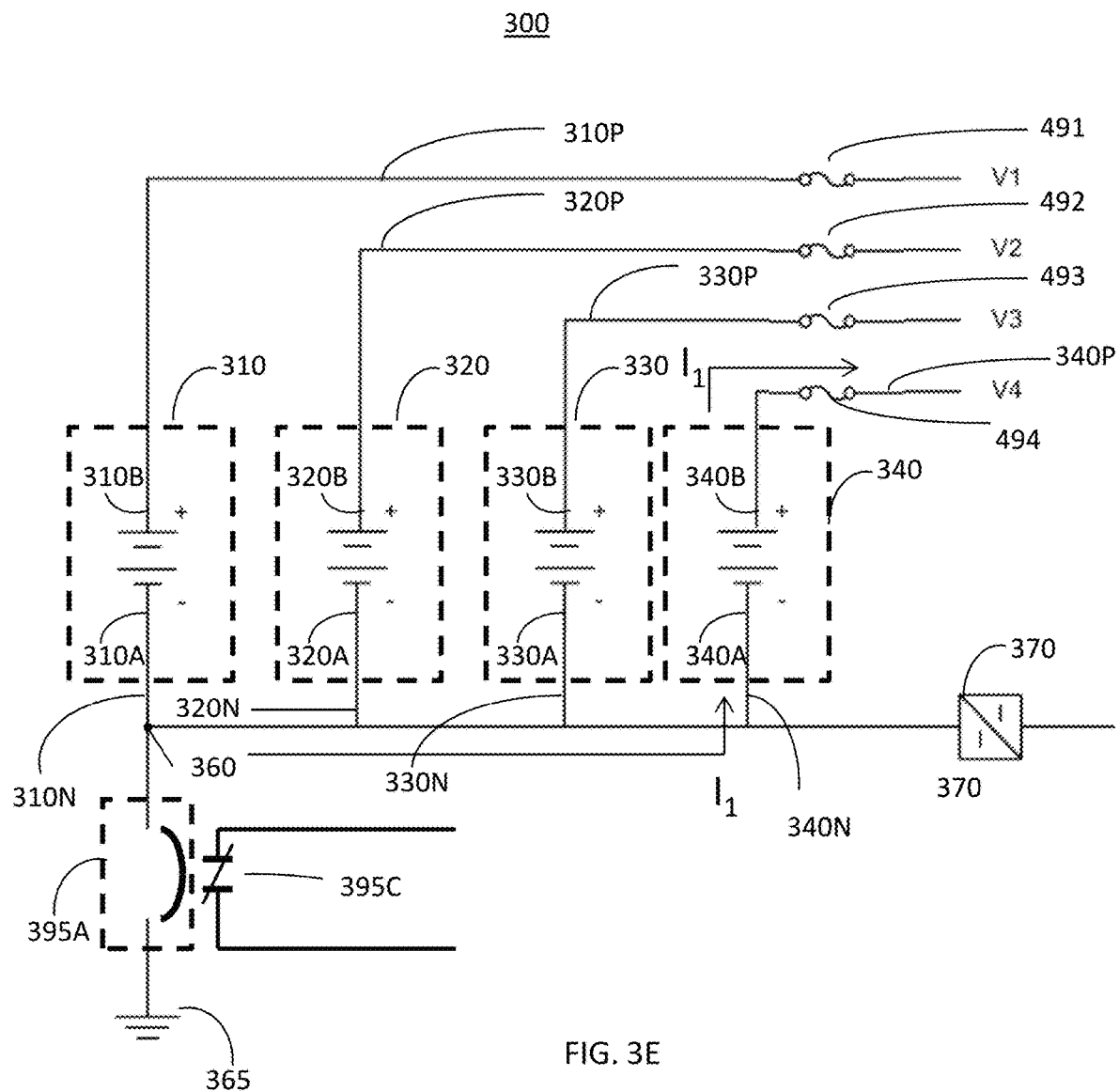
FIG. 3E is a schematic showing an addition of a circuit breaker according to an embodiment.

Optionally, circuit breaker 395A may include an auxiliary contact 395B allowing for remote monitoring of the status (e.g., open or closed) of circuit breaker 395A. Monitoring via auxiliary contacts 395B may be done remotely or on site (e.g., in the same location as assembly 300). FIG. 3D shows auxiliary contact 395B as a normally open (NO) auxiliary contact that is open when it is not triggered. However, as shown in FIG. 3E, a normally closed (NC) auxiliary contact 395C may be alternatively used in place of the NO auxiliary contact 395B.

One of the advantages of using the circuit breaker 395A/auxiliary contacts 395B and 395C combination is to facilitate automatic or manual remote access to the circuit breaker more easily than by monitoring branch protection fuses 491-494. This could be done wirelessly, or by extending wires from auxiliary contacts 395B and 395C. The auxiliary contacts 395B and 395C may include a number of different components to facilitate monitoring circuit breaker 395A, including the dry contacts shown in FIGS. 3D and 3E. Additionally or alternatively the auxiliary contacts 395B and 395C may be in electrical contact with the circuit breaker 395A and monitor its status via other means, e.g., via impedance measurements, current, or voltage measurements, etc.

In addition to or in alternative to any of the components 390 described above, component 390 can include one or more resistors. The one or more resistors can be used, for example, in place of or in addition to completely opening the circuit between the negative terminals 310A-340A and ground 365. In this configuration, the one or more resistors could limit any fault current $I_1$ to a level proportionate to the effective resistance of component 390. In other words, the one or more resistors can be used to set an upper limit for the fault current $I_1$ that may depend on the specifics of the assembly 300, its desired usage, or the particular components and operational history of any one of the segments 310-340, among other considerations that will be apparent to one skilled in the art.

In this way, use of a single component 390 increases the lifetime and efficiency of assembly 300. Connecting each of segments 310-340 through component 390 to ground 365 is a relatively simple and affordable way to prolong the life of assembly 300, as it requires use of only one additional component (i.e., component 390). In addition, use of single component 390 allows for a relatively quick and easy way to reset the assembly (e.g., simply by resetting or replacing component 390 so that it allows current flow) in order to bring assembly 300 back online once the grounding fault 380 has been diagnosed and repaired. However, triggering of component 390 may not provide information regarding which of segments 310-340 experienced the grounding fault 380. In that case, other monitoring equipment (not shown) such as ammeters or voltmeters local to each of segments 310-340 may assist in localizing, diagnosing, and detecting grounding fault 380 in order to repair assembly 300 and bring it back online.

Figure 3F:
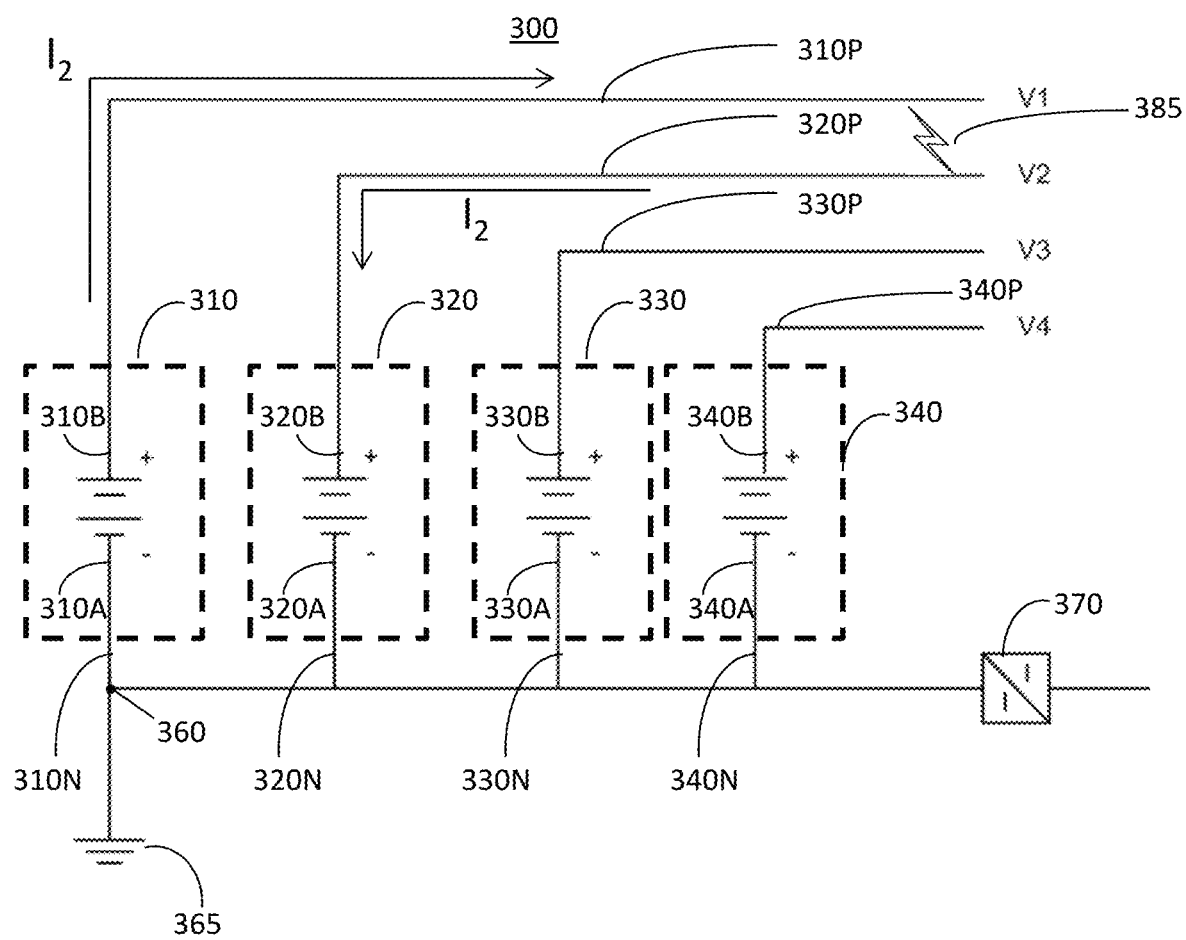
FIG. 3F is a schematic showing a segment fault in a fuel cell assembly according to an embodiment.

FIG. 3F shows another type of fault that can happen when the negative terminals 310A-340A are grounded, such as in the configuration shown in FIG. 3A. Specifically, FIG. 3F shows "segment fault" 385, occurring as a short between adjacent positive lines 310P and 320P of respective segments 310 and 320. The fault 385 produces a short current $I_2$ flowing in a loop encompassing both segments 310 and 320 and the ground 365 via node 360. $I_2$ may be large enough to cause substantial overheating and damage to segments 310 and 320. The magnitude and direction of $I_2$ may depend on the output levels (e.g., V1 and V2) of segments 310 and 320. If $I_2$ is large, it may substantially decrease the output voltages V1 and V2, for example driving them to near zero.

As with the grounding fault 380 (shown in FIG. 3C), the segment fault can drive the entire output of the assembly 300 to zero and potentially cause damage to sensitive components in the stacks 10. When the segment fault 385 occurs, diagnosing and fixing the fault 385 may require shutting down the entire assembly 300 for an extended period of time, as described in the context of grounding fault 380 above.

Figure 3G:
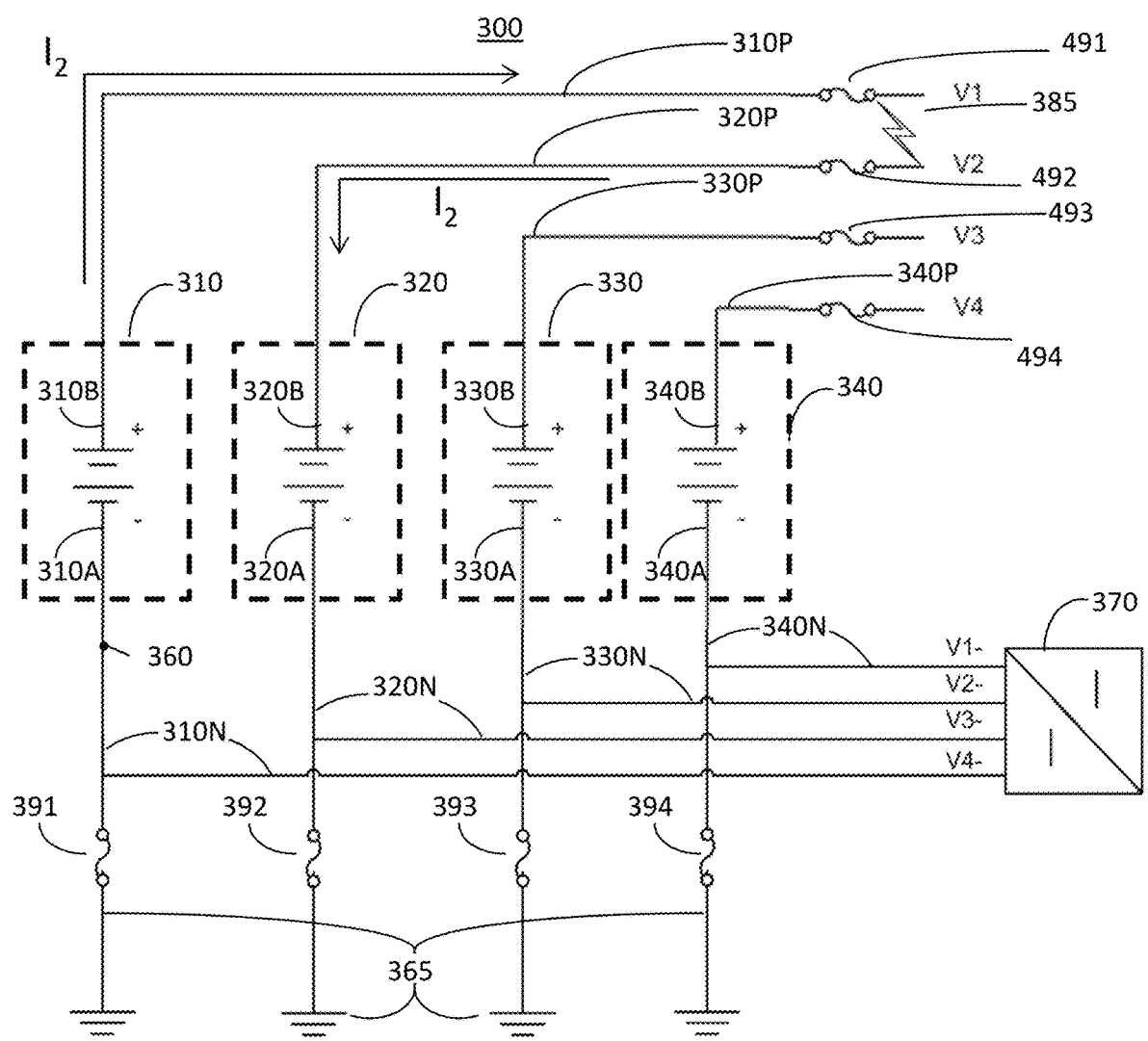
FIG. 3G is a schematic showing an addition of a component to mediate the segment of FIG. 3F according to an embodiment.

A solution to the problem created by current $I_2$ and segment fault 385, according to various embodiments, is shown in FIG. 3G. The solution uses components 391-394 to respectively connect each negative terminals 310A-340A and respective negative lines 310N-340N to ground 365. Components 391-394 may be independent of one another and have an independent line to ground 365, as shown in FIG. 3G. Alternatively, each component 391-394 may be electrically connected to ground via a common connection that links one end of all components 391-394. In this way, embodiments encompass not just the configurations shown in FIGS. 3C and 3G, but combinations of these two embodiments. In this embodiment, the common node 360 may be omitted, and every respective negative terminal and its associated negative line are electrically connected to a different one of the respective components 391-394.

Components 391-394 may be separate impedance creating elements, such as fuses, resistors, or breakers. Like component 390 discussed above, components 391-394 may cause an open circuit between terminals 310A-340A and ground 365 when the current reaches a level indicating a short (e.g., such as a short due to a segment fault 385 in segments 310-340, as shown in FIGS. 3F and 3G). The current or voltage resulting from such a fault may trigger component 391. Once triggered, component 391 may cause the circuit subject to current $I_2$ to become an open circuit. The same fault 385 may also, or alternatively, trigger component 392 to similar effect. In other words, component 392 may be triggered by the large current $I_2$ to open the circuit encompassing segments 310 and 320 and cut them off from ground, thus preventing the large loop current $I_2$ from persisting. In either case, triggering components 391 and 392 prevents $I_2$ from decreasing the output of segments 310 and 320 and/or causing severe damage to segments 310-340. Triggering components 391 and 392 also may prevent the entire assembly 300 from needing to be shut down or placed offline when the current $I_2$ is detected, for the same reasons discussed above in the context of component 390.

FIG. 3G also shows three additional components 392-394, each performing a similar function to component 391. Each component 392-394 can isolate two adjacent lines experiencing a segment fault, such as segment fault 385 between lines 310P and 320P. For example, a segment fault between lines 320P and 330P of adjacent segments 320 and 330 could trigger components 392 and 393 to open the connection between segments 320 and 330, respectively, and ground 365. This could prevent a loop current (not shown in FIG. 3G) from flowing through segments 320 and 330 and decreasing output voltages V2 and V3. Once components 392 and 393 are triggered, selective maintenance on the affected components (e.g., segments 320 and 330) can be performed without having to shut down the entire assembly 300. Performing maintenance without shutting down assembly 300 entirely can maintain its efficiency and prevent the need to ramp up/down the temperature of more components than segments 320 and 330. Similarly, components 393 and 394 can be triggered, in conjunction, to prevent a loop current flowing through segments 330 and 340 to ground 365, and allowing selective servicing of the affected components to prevent the need to shut down the entire assembly 300, thus improving efficiency.

As shown in FIG. 3G, each negative terminal 310A-340A and component 391 to 394 is separately connected to DC/DC converter 370 in order to drive segments 310-340. However, it is to be understood that other arrangements are possible. For example, multiple negative terminals 310A-340A may be connected to the DC/DC converter, in the manner shown in FIG. 3C. Alternatively, one or more of the positive segments 310A-340A can be independently connected to DC/DC converter 370.

Note that components 391-394 also serve to prevent grounding fault 380 discussed above in the context of FIGS. 3B-3C. This is because, just as discussed above in the context of FIG. 3C, each of components 391-394 can individually cut off current $I_1$ caused by a grounding fault 280. Components 391-394 can do this by cutting off access to ground for any individual negative terminals 310A-340A if the corresponding positive terminals 310B-340B is shorted to ground 365.

Fault detection and location in assembly 300, as shown in FIG. 3G, may include as ascertaining which component(s) 391-394 were triggered by the fault. The segments associated with the triggered components are likely the segments in which the fault occurs.

Figure 3H:
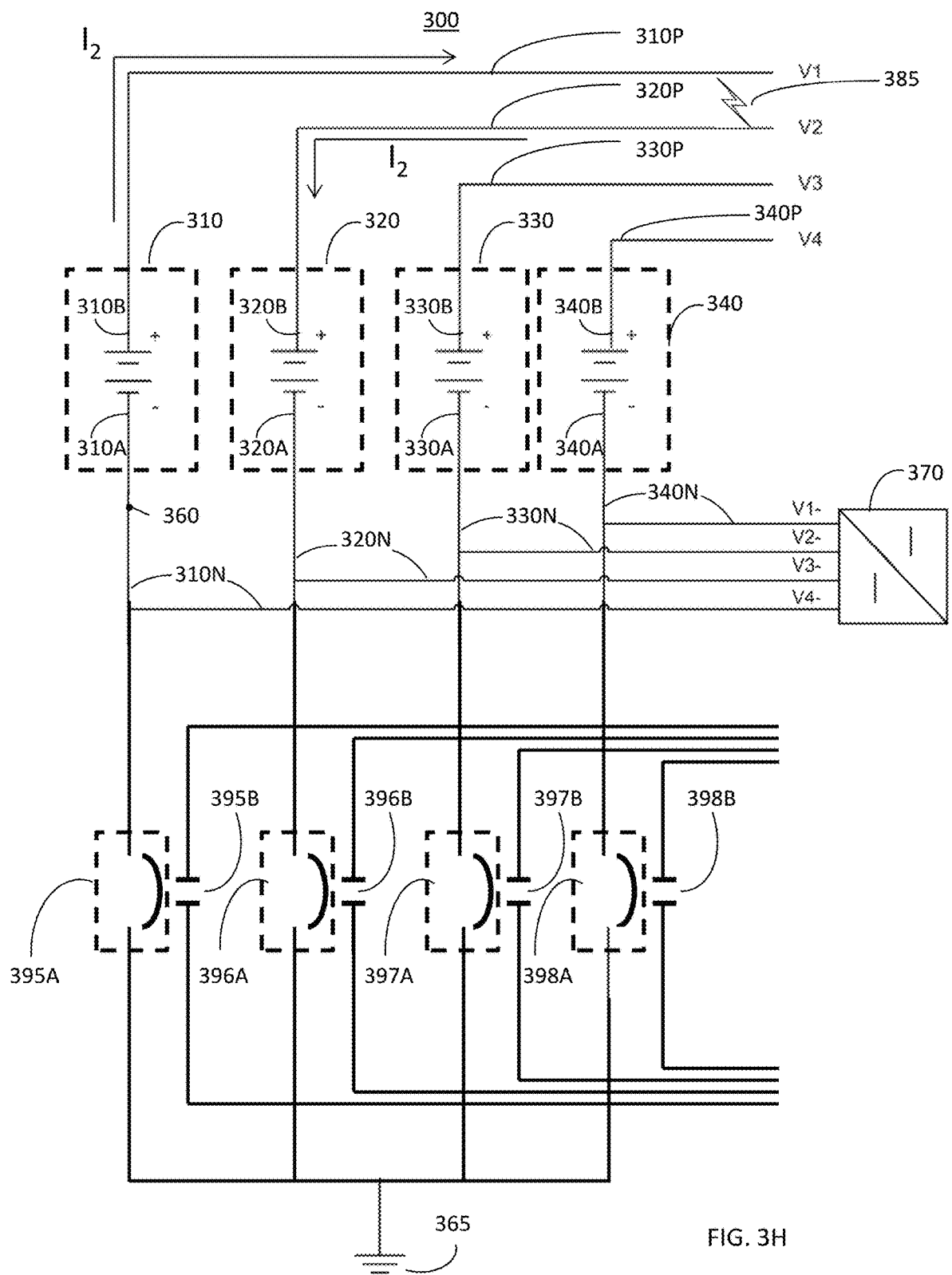
FIG. 3H is a schematic showing an addition of a multiple circuit breakers according to an embodiment.
Figure 31:
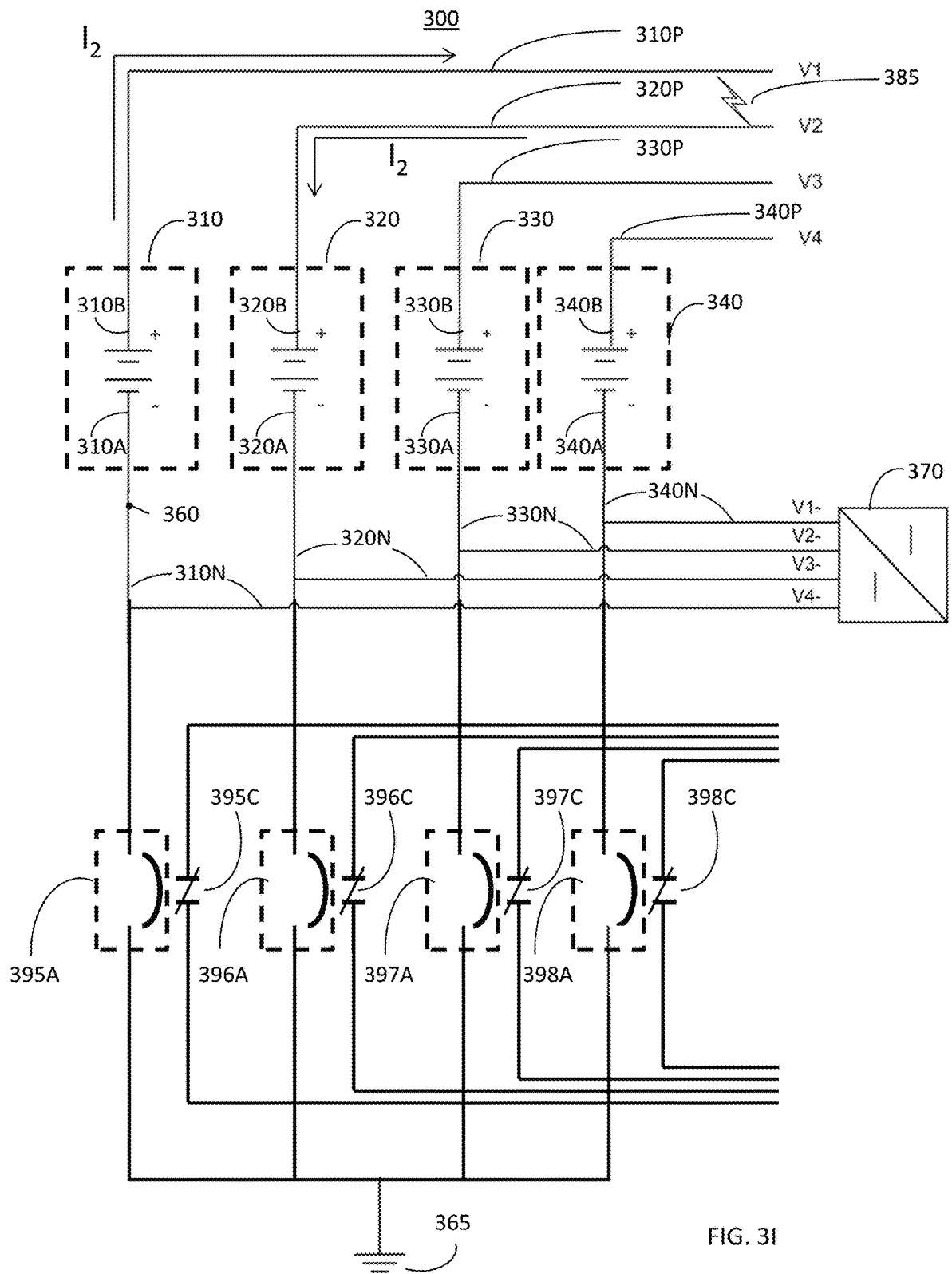

FIG. 3H shows another embodiment that includes a circuit breakers 395A-398A as a supplement to branch protection fuses 491-494 installed on positive lines 310P-340P, respectively. Circuit breakers 395A-398A are installed in place of components 391-394, respectively, shown in FIG. 3G. The description and function of circuit breakers 395A-398A parallels the discussion of circuit breaker 395A above in the context of FIG. 3D. The major difference is that circuit breakers 395A-398A are configured to individually offer additional protection or monitoring to each segment 310-340, respectively. Each circuit breaker 395A-398A may be triggered independently by a surge current flowing through its respective segment 310-340. They perform a similar function, namely to open the circuits between ground 365 and negative terminals 310N-340N, reducing or preventing, for example, surge current $I_2$ from segmentation fault 385 causing damage to the assembly 300, as described above for components 391-394 in the context of FIG. 3G.

As discussed above in the context of FIG. 3D, branch protection fuses 491-494 may be configured to trigger and, thereby, cause an open circuit in response to a surge current (e.g., current $I_2$ shown in FIG. 3H). Circuit breakers 395A-398A may have lower threshold triggering currents than branch fuses 491-494, thereby offering additional protection from surge currents for each segment 310-340, respectively. Alternatively circuit breakers 395A-398A may have the same or similar threshold as branch fuses 491-494 to facilitate, for example, monitoring, as discussed in more detail below.

Circuit breakers 395A-398A may include an auxiliary contacts 395B-398B allowing for remote monitoring of the status (e.g., open or closed) of circuit breakers 395A-398A. Each auxiliary contact 395B-398B could monitor its respective circuit breaker 395A-398A independently, allowing the diagnosis and repair of faults in the specific segment 310-340 associated with a triggered circuit breaker 395A-398A. As discussed above in the context of FIG. 3D, monitoring via auxiliary contacts 395B-398B may be done remotely or on site (e.g., in the same location as assembly 300). One of the advantages of using the circuit breaker 395A-398A/auxiliary contact 395B-398B combination is to facilitate automatic or manual remote access to the circuit breaker more easily than by monitoring branch protection fuses 491-494. This could be done wirelessly, or by extending wires from auxiliary contacts 395B-398B. The auxiliary contacts 395B-398B may include a number of different components to facilitate monitoring circuit breakers 395A-398A, including the dry contacts shown in FIG. 3H. Additionally or alternatively the auxiliary contacts 395B-398B may be in electrical contact with their respective circuit breakers 395A-398A and monitor its status via other means, e.g., via impedance measurements, current, or voltage measurements, etc.

FIG. 3H shows auxiliary contacts 395B-398B as a normally open (NO) auxiliary contacts that remain open when they are not triggered. However, as shown in FIG. 3I, normally closed (NC) auxiliary contacts 395C-398C may be alternatively used in place of the NO auxiliary contacts 395B-398B.

Assembly 300, as shown in FIGS. 3B-3I may provide additional methods for ascertaining various faults, such as grounding fault 380 or segment fault 385. One method may involve, for example, measuring the potential of both positive terminals 310B-340B and negative terminals 310A-340A for their respective lines 310P-340P with respect to ground 365. When any of components 390-398 have not been triggered by large currents (i.e., allow substantial current to flow to ground), the negative terminal or line should exhibit a grounded voltage (0V with respect to ground) and the positive terminal or line should exhibit a positive voltage ($V_{tot}$). On the other hand, if a component 390-398A (e.g., 390, 391-394, 395A or 395A-398A) has been triggered to prevent current flow, the negative terminal or line should exhibit a voltage approximately equal to $-V_{tot}/2$ while the positive terminal or line should exhibit voltage of $+V_{tot}/2$. When the latter condition is detected, the component(s) 390-398A can be replaced or reset after troubleshooting and removing ground 380 or segment fault 385. In this way the ground 380 or segment fault 385 without interrupting overall assembly 300 operation. The potential measurement can be made, for example, at DC/DC converter 370 and/or upstream from the entire assembly 300, such as outside the exterior enclosure (e.g., "hotbox") containing the fuel cell columns.

Figure 4:
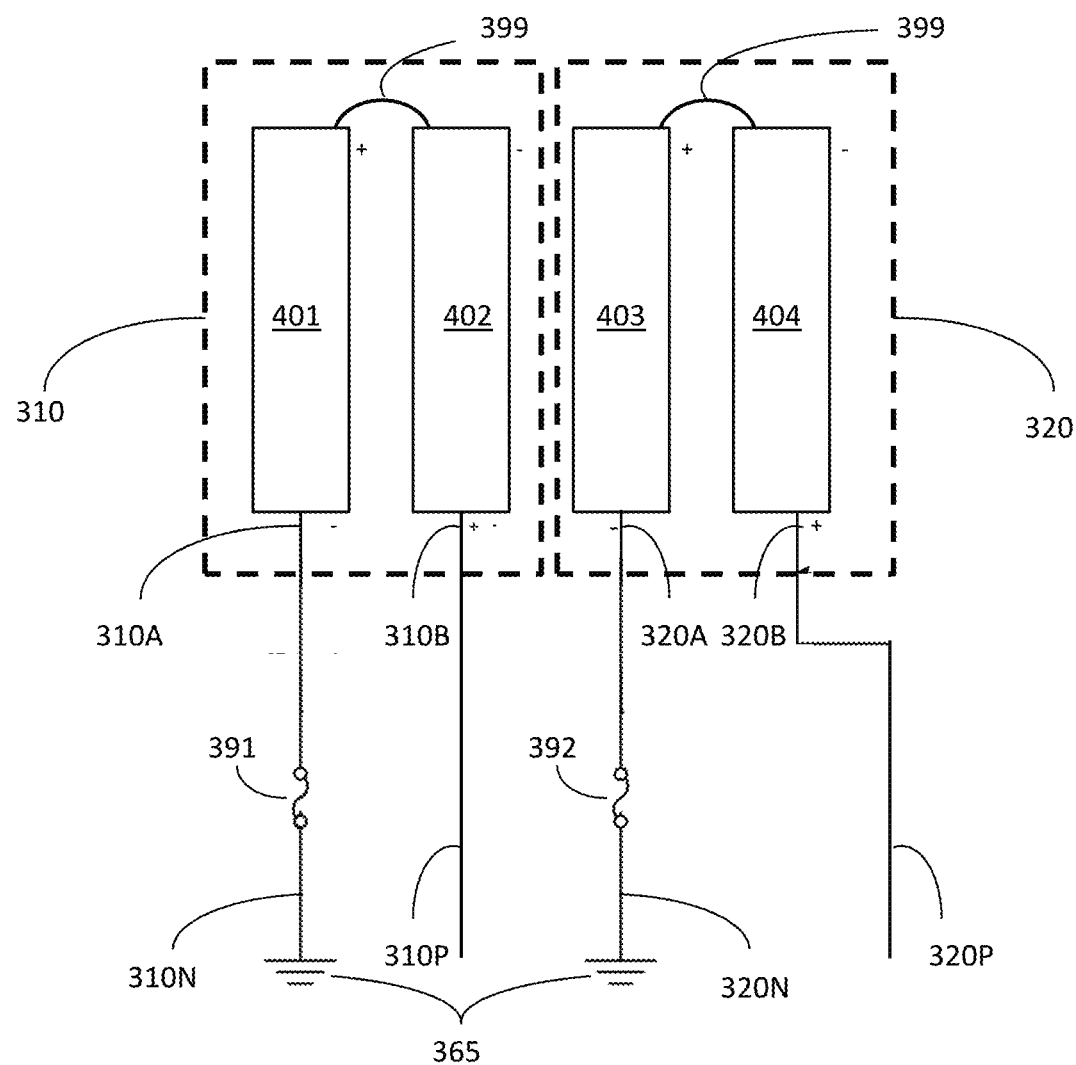
FIG. 4 shows an exemplary four column stack according to an embodiment.

In addition, where one or more of the segments 310-340 includes multiple columns, the detected voltage at the terminals or lines can be utilized to ascertain the particular column where the fault occurs. FIG. 4 shows an example where segments 310 and 320 from FIG. 3G has been re-drawn to show four columns: each segment 310, 320 has a respective odd column (401 and 403) and even column (402 and 404). The opposite polarity terminals of columns in each segment can be electrically connected by a conductive jumper 399. Once component 391 triggers to cut segment 310 off from ground 365, the location of the fault can be determined via measuring the voltage at negative line 310A and comparing against the voltage at positive line 310P. If the magnitude of the voltage measured at the negative line 310A is low (in this example, $-V_{tot}/4$, where "$V_{tot}$" is the total segment voltage) while the magnitude of the voltage at the positive line 310P is high (e.g., $+3V_{tot}/4$), the fault likely occurs near the first odd column (i.e., column 401) contacting the negative terminal 310A. Conversely, if the magnitude of the voltage measured at the negative line 310A is larger (e.g., $-3 V_{tot}/4$) than the magnitude of the voltage measured at the line 310P (e.g., $+V_{tot}/4$), the fault likely occurs near the even column (i.e., column 402) having the positive terminal 310B. This method can be used to approximate the location of the fault in a segment with an arbitrary number of columns.

Triggering of components 390-398 may be detected and controlled remotely. For example, a remote central console may display whether or not any of components 390-398 are triggered. In the event of a trigger, repair personnel may be dispatched to the site of the particular fault. In this case, remotely controllable switch can be used as component 390-398. Then, triggering the component 390-398 will remove ground when, for example, a grounding fault 380 is detected (segment voltage becomes zero).

Like component 390, components 391-394 may be any suitable component that will open a circuit in response to current. For example, components 391-394 may be a fuse that opens at a particular current, such as 1A (e.g., a single use or "one time" fuse, multiple use fuses, resettable fuses, cartridge fuses, spade or plug in fuses, SMD fuses, HRC fuses, PTC Thermistors or axial fuses). One of ordinary skill in the art will recognize that a number of other types of suitable fuses may be used within the context of the present invention as components 391-394.

As an alternative to fuses, components 395A-398A may be a circuit breaker or other type of current detecting/stopping device. For example, components 395A-398A may be a single or multiple interrupter circuit breaker, thermal or magnetic protection circuit breakers, molded-case circuit breakers, "plug-in" circuit breakers, etc. One of ordinary skill in the art will recognize that a number of other types of circuit breakers may be used within the context of the present invention as components 395A-398A. Moreover, although FIG. 3G shows components 391-394 as similar or the same, this need not be the case. For example, it may be advantageous to choose different components 390-398A such that each component 390-398A is appropriate for the specific parameters (e.g., operating current, output voltage, etc.) for its corresponding segment 310-340.

In addition to or in alternative to any of the component 390-398A described above, components 390-398A can include one or more resistors. The one or more resistors can be used, for example, in place or in lieu of completely opening the circuit between the negative terminals 310A-340A and ground 365. In this configuration, the one or more resistors could limit any fault current $I_2$ to a level proportionate to the effective resistance of component 390. In other words, the one or more resistors can be used to set an upper limit for the fault current $I_2$ that may depend on the specifics of the assembly 300, its desired usage, or the particular components and history of any one of the segments 310-340, among other things.

Figure 5:
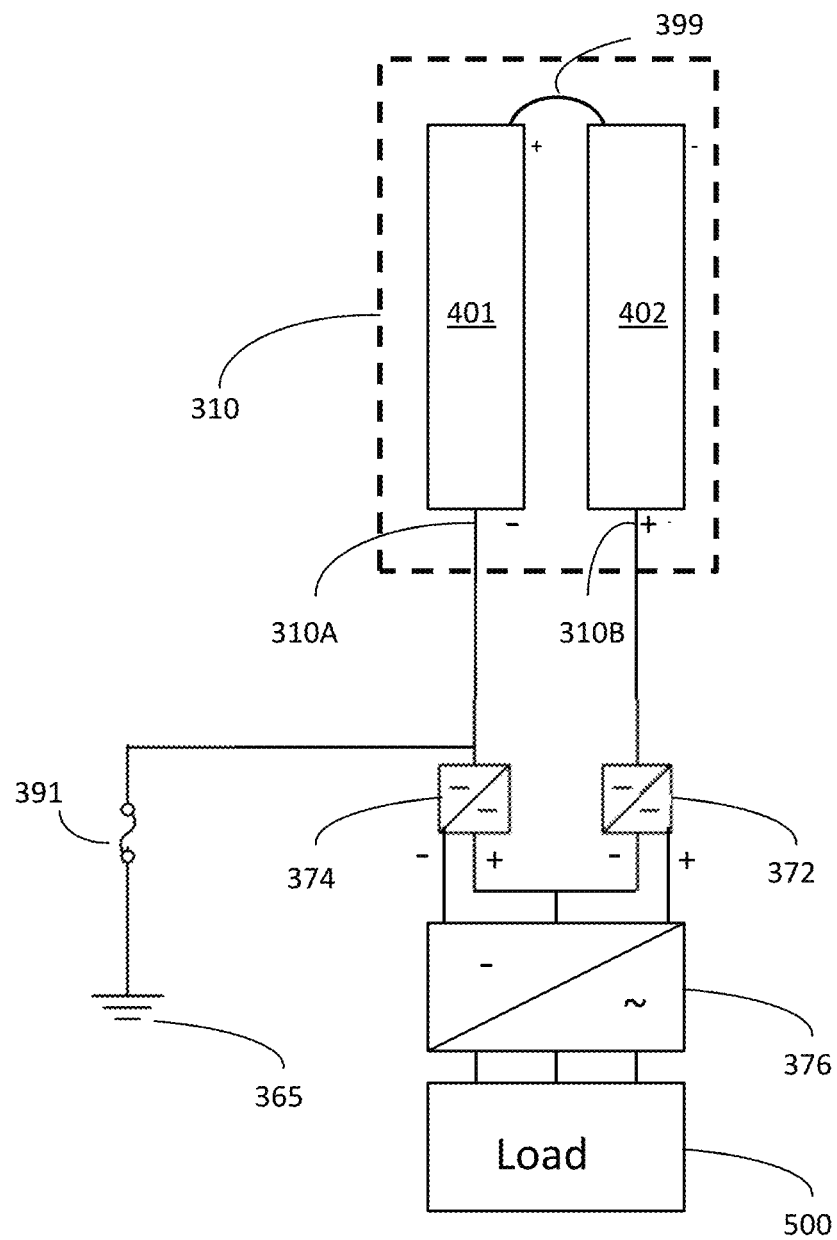
FIG. 5 shows the first segment of the stack of FIG. 4 connected to a load via DC/DC and DC/AC converters.

FIG. 5 shows one of the segments of FIG. 4 connected to a load 500 via DC/DC converters 370 and 372 and DC/AC inverter 374. As shown in FIG. 5, the negative terminal 310A of the segment 310 is connected to ground 365 via component 391. FIG. 5 shows that the negative terminal 310A is also connected to a load via the first DC/DC converter 370 and the DC/AC inverter 374. The positive terminal 310B of segment 310 is also connected to the load 500 through a second DC/DC converter 372 and the DC/AC inverter 374. The first DC/DC converter 370 provides a negative line to the inverter 374 and the second DC/DC converter 372 provides a positive line to the inverter 374. Furthermore, branches of the negative and positive leads may be connected to each other to provide a neutral line to the inverter 374 for a three phase current output. Although two separate DC/DC converters 370 and 372 are shown in FIG. 5, it is to be understood that both positive 310B and negative 310A terminals can be connected to a single, shared DC/DC converter (not shown). In another alternative embodiment, two DC/AC converters may connect terminals 310A and 310B separately to the load 500. Note that FIG. 5 shows no independent connection to ground for positive terminal 310B. In one embodiment, the positive lines 310P-340P can be electrically isolated (i.e., not electrically connected) to ground either directly or through a fuse, circuit breaker or resistor.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A fuel cell system, comprising:
    a plurality of fuel cell segments, each segment having a plurality of fuel cells and each segment comprises:
        a positive terminal having a positive voltage with respect to ground; and
        a negative terminal;
    at least one impedance creating component electrically connecting the negative terminal of each segment to ground, the at least one impedance creating component configured to decrease a surge current through the segments in response to the surge current; and
    ceramic side baffles are located adjacent to the fuel cell segments;
    wherein the negative terminal is configured during operation to have a potential that is substantially 0 V with respect to ground; and
    wherein the system is configured to maintain the potential of the negative terminal at substantially 0 V with respect to ground to decrease corrosion of the ceramic side baffles by at least one of alkali or alkali earth ions.

2. The fuel cell system of claim 1, wherein the surge current corresponds to a voltage across the at least one impedance creating component of greater than 300 V.

3. The fuel cell system of claim 1, wherein the at least one impedance creating component comprises a fuse.

4. The fuel cell system of claim 1, wherein the at least one impedance creating component comprises a positive temperature coefficient thermistor.

5. The fuel cell system of claim 1, wherein each negative terminal is electrically connected by a negative line to a first end of the at least one impedance creating component and a second end of the at least one component is electrically connected to ground.

6. The fuel cell system of claim 5, wherein, in operation, the surge current passes between the first and second ends of the at least one impedance creating component.

7. The fuel cell system of claim 1, wherein the at least one impedance creating component is configured to decrease the surge current in 10 ms or less.

8. The fuel cell system of claim 1, wherein:
    the fuel cells are solid oxide fuel cells.

9. The fuel cell system of claim 8, wherein each segment comprises a first fuel cell column having the negative terminal and a second fuel cell column having the positive terminal.

10. The fuel cell system of claim 1, wherein at the least one impedance creating component comprises a plurality of components electrically connecting each of the negative terminals to ground.

11. The fuel cell system of claim 10, wherein each negative terminal is electrically connected to ground via a different one of the plurality of components.

12. The fuel cell system of claim 1, wherein:
    the negative terminal is connected to a first DC/DC converter via a negative line;
    the positive terminal is connected to a second DC/DC converter via a positive line;
    the first and the second DC/DC converters are connected to a DC/AC inverter; and
    the positive line is electrically isolated from ground.

13. A method of operating a fuel cell system, comprising:
    providing a plurality of fuel cell segments, each segment having a plurality of fuel cells, and each segment comprising:
        a positive terminal having a positive voltage with respect to ground; and
        a negative terminal;
    providing ceramic side baffles located adjacent to the fuel cell segments;
    providing a surge current through at least one impedance creating component and connecting the negative terminal of each segment to ground so that at least one impedance creating component decreases the surge current through the segments in response to the surge current; and
    maintaining, during the operating the fuel cell system, a potential of the negative terminal at substantially 0 V with respect to ground to decrease corrosion of the ceramic side baffles by at least one of alkali or alkali earth ions.

14. The method of claim 13, wherein:
    the at least one impedance creating component comprises a fuse or circuit breaker; and
    the method further comprises opening the fuse or circuit breaker in response to the surge current passing through the fuse or circuit breaker.

15. The method of claim 13, further comprising detecting a fault in the fuel cell system by:
    measuring a potential of the negative terminal with respect to ground;
    measuring a potential of the positive terminal with respect to ground; and
    locating the fault in the system by comparing the potential of the negative terminal to the potential of the positive terminal.

16. The fuel cell system of claim 1, wherein the at least one impedance creating component electrically connects the negative terminal of all of the plurality of fuel cell segments of the fuel cell system to ground.

17. The fuel cell system of claim 1, wherein the at least one component comprises a circuit breaker.

* * * * *